United States Patent
Shah et al.

(10) Patent No.: US 10,998,967 B2
(45) Date of Patent: May 4, 2021

(54) SYSTEMS AND METHODS FOR PSEUDO RANDOM BEACON SIGNAL SCHEDULING AND DATA SCHEDULING TO IMPROVE NETWORK CONDITIONS

(71) Applicant: Locix, Inc., San Bruno, CA (US)

(72) Inventors: Pratim M. Shah, Fremont, CA (US); Harish Munjulur, San Bruno, CA (US); Soon Hyeok Choi, Cupertino, CA (US)

(73) Assignee: LOCIX, INC., San Bruno, CA (US)

( * ) Notice: Subject to any disclaimer, the term of this patent is extended or adjusted under 35 U.S.C. 154(b) by 12 days.

(21) Appl. No.: 16/283,496

(22) Filed: Feb. 22, 2019

(65) Prior Publication Data
US 2020/0274612 A1 Aug. 27, 2020

(51) Int. Cl.
| | |
|---|---|
| *H04B 7/26* | (2006.01) |
| *H04W 4/38* | (2018.01) |
| *H04W 72/12* | (2009.01) |
| *H04W 56/00* | (2009.01) |
| *H04W 28/02* | (2009.01) |
| *H04W 72/04* | (2009.01) |

(52) U.S. Cl.
CPC ........... *H04B 7/2656* (2013.01); *H04B 7/265* (2013.01); *H04W 4/38* (2018.02); *H04W 28/0221* (2013.01); *H04W 56/001* (2013.01); *H04W 72/0446* (2013.01); *H04W 72/12* (2013.01)

(58) Field of Classification Search
CPC ..... H04W 4/04; H04W 4/38; H04W 28/0221; H04W 56/001; H04W 72/0446; H04W 72/12; H04B 7/265; H04B 7/2656
See application file for complete search history.

(56) References Cited

U.S. PATENT DOCUMENTS

| | | | |
|---|---|---|---|
| 2009/0232057 A1 | 9/2009 | Doi et al. | |
| 2010/0128706 A1* | 5/2010 | Lee | H04W 52/0216 370/338 |
| 2014/0056192 A1* | 2/2014 | Meylan | H04W 48/16 370/311 |
| 2014/0241308 A1 | 8/2014 | Hoffmann et al. | |
| (Continued) | | | |

FOREIGN PATENT DOCUMENTS

EP    3373647 A1    9/2018

OTHER PUBLICATIONS

International Search Report and Written Opinion for PCT/US2020/017855, dated Jun. 15, 2020, 14 pages.

*Primary Examiner* — Paul H Masur
(74) *Attorney, Agent, or Firm* — Jaffery Watson Mendonsa & Hamilton LLP

(57) ABSTRACT

Systems and methods for pseudo random beacon signal scheduling and data scheduling to improve network conditions within a wireless network are disclosed herein. In one embodiment, a system for providing a wireless asymmetric network, comprises a hub having one or more processing units and at least one antenna for transmitting and receiving radio frequency (RF) communications in the wireless asymmetric network. A plurality of sensor nodes each have a wireless device with a transmitter and a receiver to enable bi-directional RF communications with the hub in the wireless asymmetric network. The system determines dynamic beacon frequency control with a variable delay duration for starting at least one superframe of the hub.

14 Claims, 16 Drawing Sheets

(56) References Cited

U.S. PATENT DOCUMENTS

| | | | |
|---|---|---|---|
| 2015/0341853 A1* | 11/2015 | Cho | H04W 48/20 |
| | | | 370/331 |
| 2017/0332375 A1 | 11/2017 | Dinh et al. | |
| 2018/0249500 A1 | 8/2018 | Yoshimura et al. | |
| 2019/0140879 A1* | 5/2019 | Haapola | H04W 56/0035 |
| 2019/0182705 A1* | 6/2019 | Chung | H04W 28/0205 |

* cited by examiner

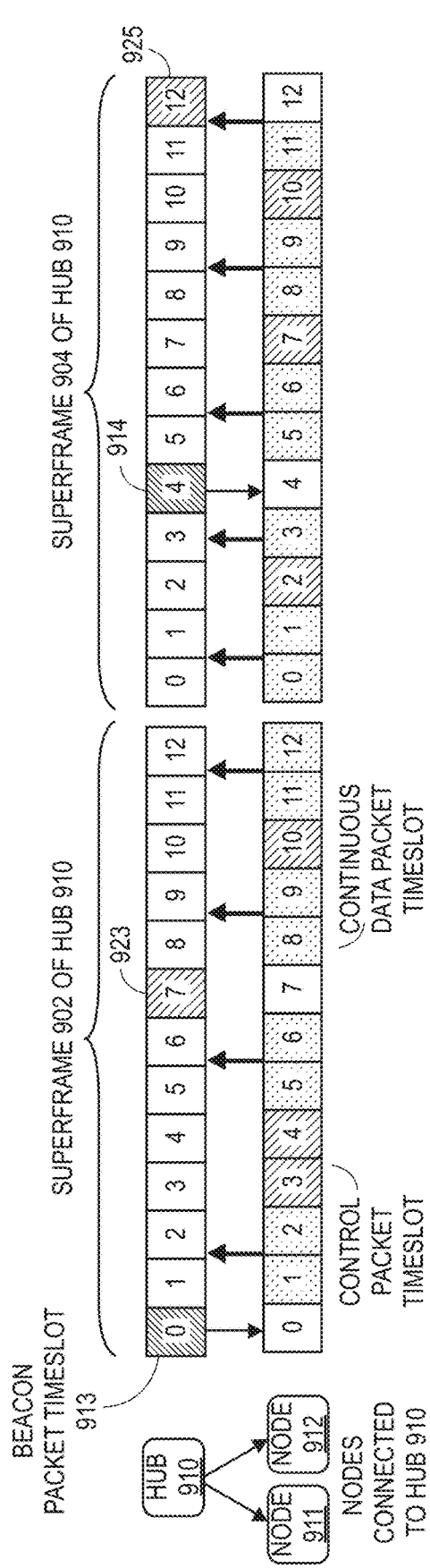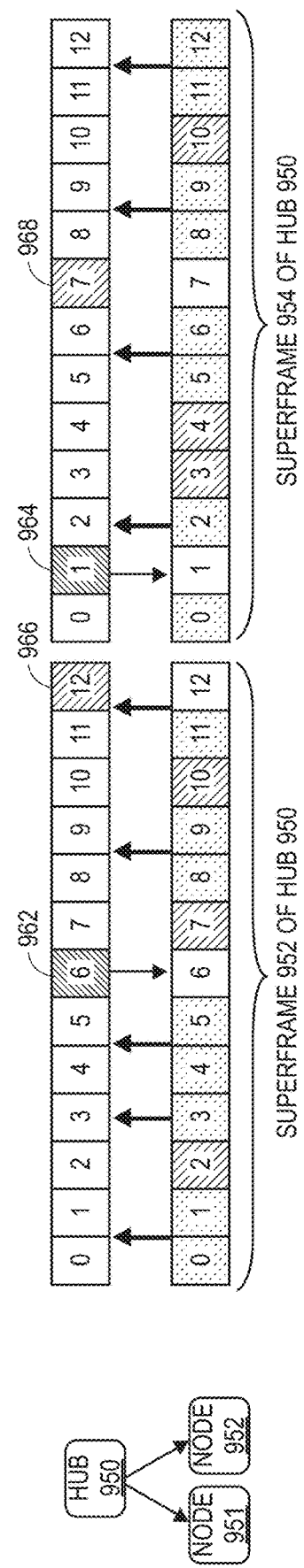
FIG. 9A
FIG. 9B

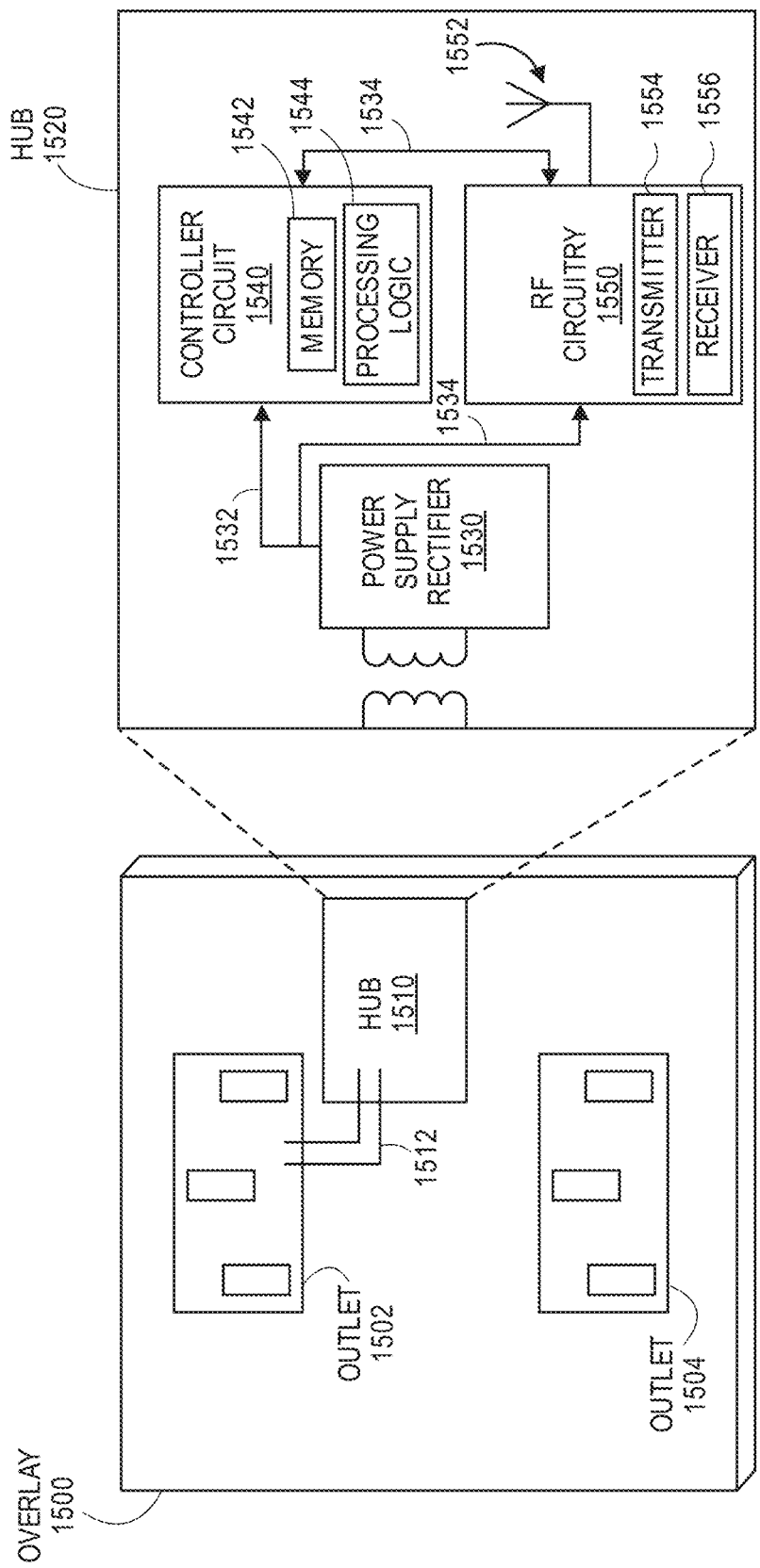

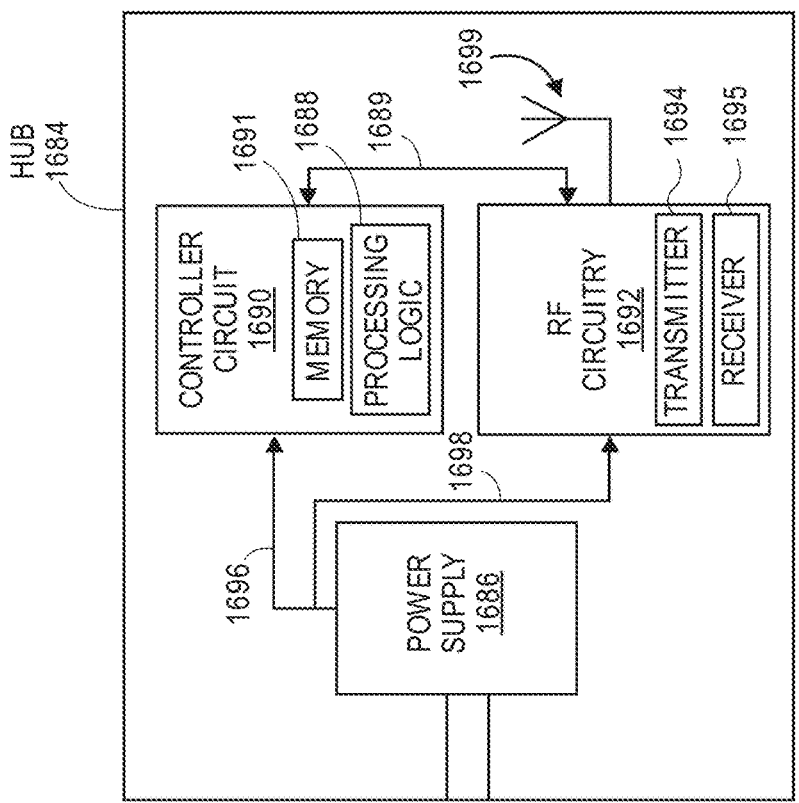
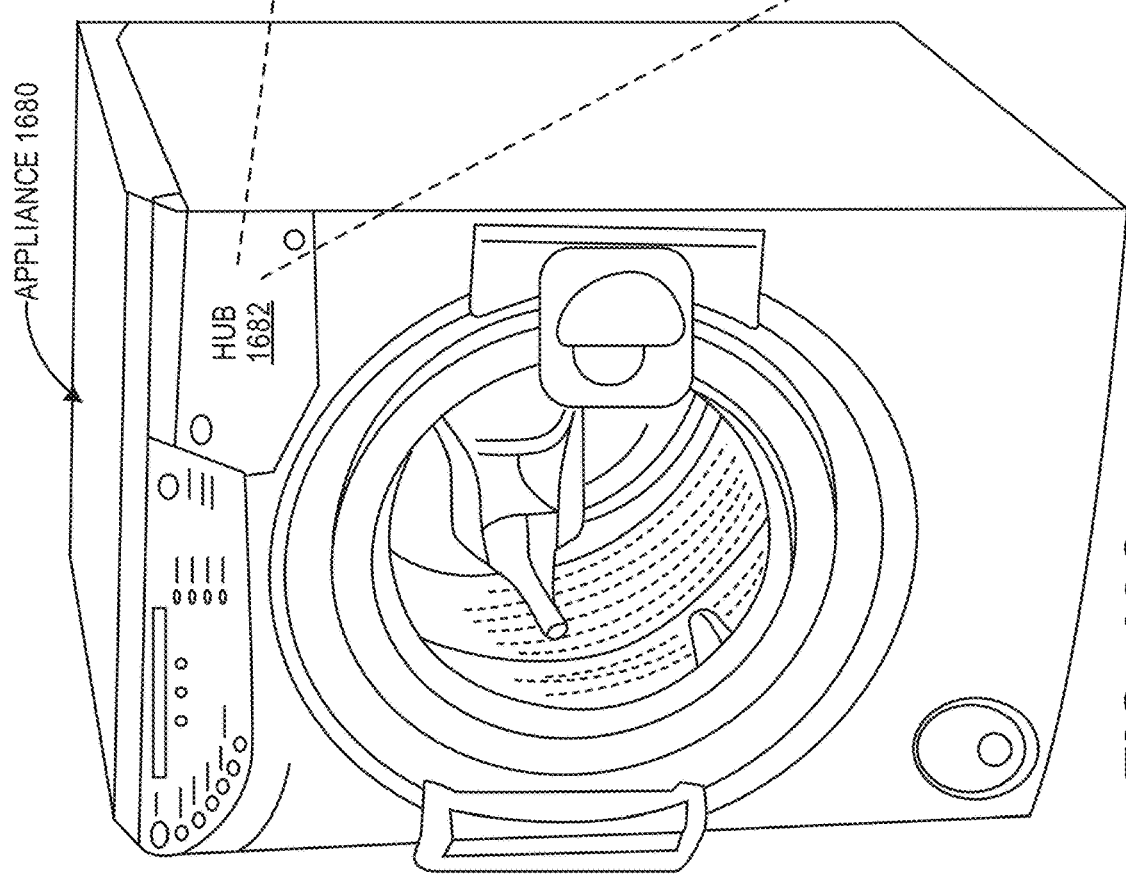
FIG. 12D
FIG. 12C

SYSTEMS AND METHODS FOR PSEUDO RANDOM BEACON SIGNAL SCHEDULING AND DATA SCHEDULING TO IMPROVE NETWORK CONDITIONS

FIELD

Embodiments of the invention pertain to systems and methods for pseudo random beacon signal scheduling and data scheduling to improve network conditions within a wireless network are disclosed herein.

BACKGROUND

Most TDMA (Time Based Multiple Access) communication systems define a superframe that is a scheduling unit that defines the time of data exchanges for individual networks entities (hubs and nodes). The same pattern of a superframe keeps repeating in time.

An exemplary superframe structure is shown in FIG. 1. The superframe is composed of 49 timeslots. Timeslot 0 is a beacon timeslot. A hub sends a beacon while all the nodes that are connected to the hub wait for and receive the beacon. Then data timeslots from timeslot 1 to timeslot 11 are assigned for nodes to allow the back to back transmission of a large size data.

Timeslot 12, 13, 25 and 37 are control packet timeslots that allow the hub and nodes to exchange control packets. For the communication systems that require higher throughput, all other timeslots in a superframe are assigned for large size data delivery.

SUMMARY

For one embodiment of the present invention, systems and methods for pseudo random beacon signal scheduling and data scheduling to improve network conditions within a wireless network are disclosed herein. In one embodiment, a system for providing a wireless asymmetric network, comprises a hub having one or more processing units and at least one antenna for transmitting and receiving radio frequency (RF) communications in the wireless asymmetric network. A plurality of sensor nodes each have a wireless device with a transmitter and a receiver to enable bi-directional RF communications with the hub in the wireless asymmetric network. The system determines dynamic beacon frequency control with a variable delay duration for starting at least one superframe of the hub.

A system for providing a wireless asymmetric network, comprises a hub having one or more processing units and at least one antenna for transmitting and receiving radio frequency (RF) communications in the wireless asymmetric network; and a plurality of sensor nodes each having a wireless device with a transmitter and a receiver to enable bi-directional RF communications with the hub in the wireless asymmetric network. The hub is configured to determine dynamic time slot control for at least one superframe of the hub having fixed duration.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIGS. 9A and 9B illustrate timing diagrams of a Dynamic time slot within a superframe for multiple hubs and sensor nodes in accordance with one embodiment.

FIG. 11A shows an exemplary embodiment of a hub implemented as an overlay 1500 for an electrical power outlet in accordance with one embodiment.

FIG. 11B shows an exemplary embodiment of an exploded view of a block diagram of a hub 1520 implemented as an overlay for an electrical power outlet in accordance with one embodiment.

FIG. 12C shows an exemplary embodiment of a hub implemented within an appliance (e.g., smart washing machine, smart refrigerator, smart thermostat, other smart appliances, etc.) in accordance with one embodiment.

FIG. 12D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1:
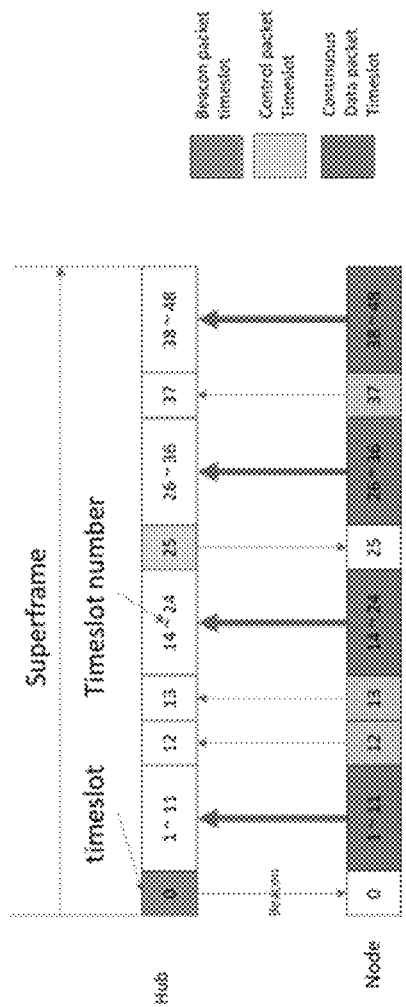
FIG. 1 illustrates an example of a superframe.

In one embodiment, systems and methods for pseudo random beacon signal scheduling and data scheduling to improve network conditions within a wireless network are disclosed herein.

For the purpose of this, indoor environments are also assumed to include near-indoor environments such as in the region around building and other structures, where similar issues (e.g., presence of nearby walls, etc.) may be present.

In one embodiment, sensor nodes of the present design consume significantly less power in comparison to power consumption of nodes of prior approaches at least partially due to having a receiver of the sensor nodes of the present design operable for a shorter time period. A non-repeating timeslot definition signal also saves time and reduces network congestion and bandwidth requirements in comparison to the prior approaches which require the timeslot definition signal to be repeated frequently.

In one embodiment, an asymmetry in power availability may be exploited to provide long range of communication in a wireless asymmetric network architecture while maintaining long battery life for nodes that are powered by a battery source. In an exemplary embodiment, a communication range of 20 meters between communicating nodes may be achieved while providing a long battery life (e.g., approximately 10 years, at least ten years) in battery operated nodes. This may be achieved by implementing an energy aware networking protocol in accordance with embodiments of this invention. Specifically, a tree-like network architecture having mesh based features may be used where long-life battery operated nodes are used on the terminal ends of the tree.

An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein. Another exemplar wireless network architecture has been described in U.S. patent application Ser. No. 14/925,889 filed on Oct. 28, 2015.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

The system may primarily have a tree network architecture for standard communications (e.g., node identification information, sensor data, node status information, synchronization information, localization information, other such information for the wireless sensor network, time of flight (TOF) communications, etc.).

A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

Figure 2:
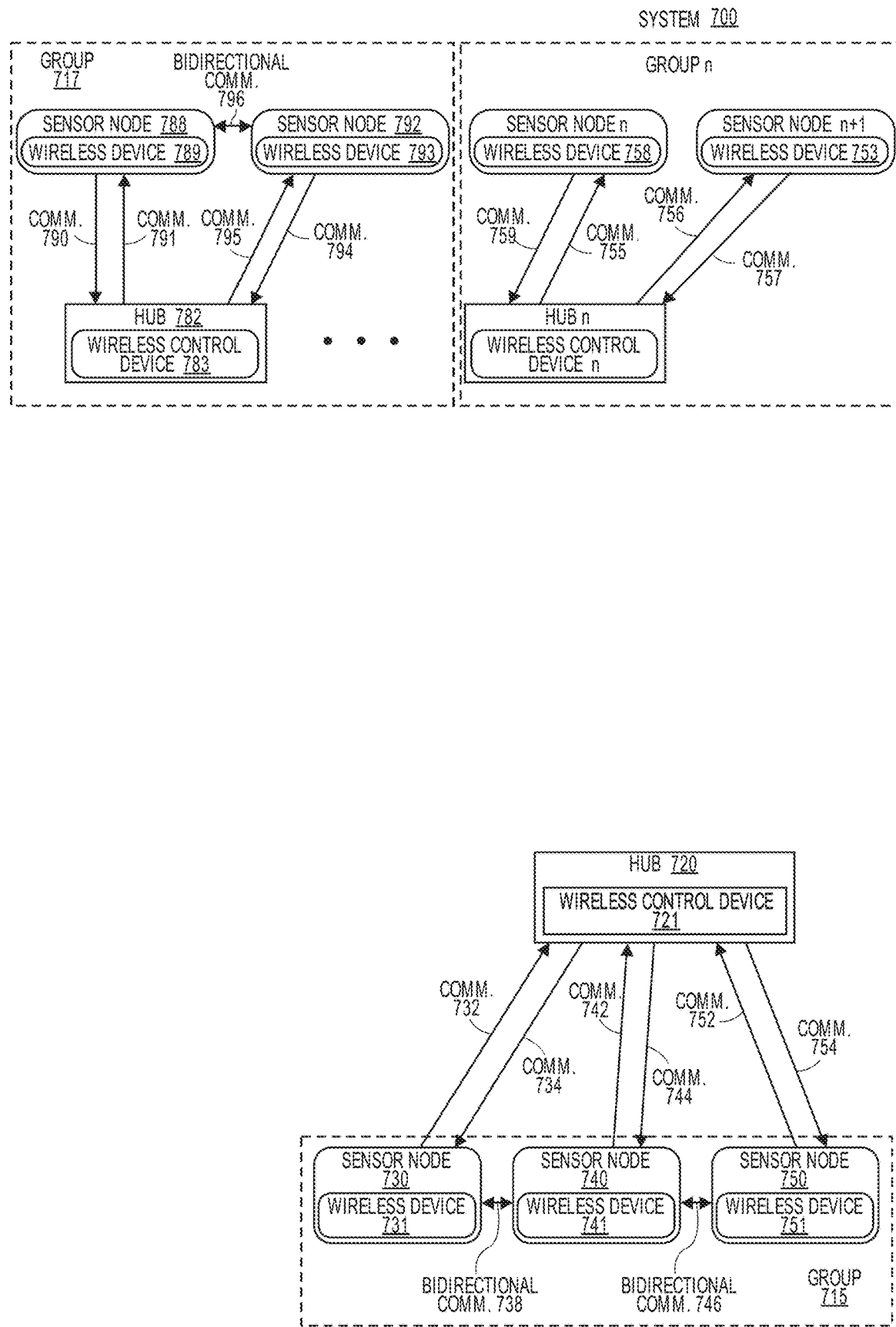
FIG. 2 shows a system with an asymmetric tree and mesh network architecture having multiple hubs in which some hubs share a radio channel while other hubs are using a different channel in accordance with one embodiment.

FIG. 2 shows a system with an asymmetric tree and mesh network architecture having multiple hubs in which some hubs share a radio channel while other hubs are using a different channel in accordance with one embodiment. The system 700 includes a hub 720 having a wireless control device 721, hub 782 having a wireless control device 783, and additional hubs including hub n having a wireless control device n.

The sensor nodes 730, 740, 750, 788, 792, n, and n+1 (or terminal nodes) each include a wireless device 731, 741, 751, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

The hub 720 communicates with sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, each hub and associated sensors nodes communication with a same RF channel. Hub 720 may use a first RF channel for communicating with associated sensors nodes, hub 782 may use a second RF channel for communicating with associated sensor nodes, and hub n may use a third RF channel for communicating with associated sensor nodes. Thus, transmissions of hubs and nodes can interfere with each other's communications that are using the same channel as well as the different channels.

By using the architecture illustrated in FIG. 2, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

Figure 3:
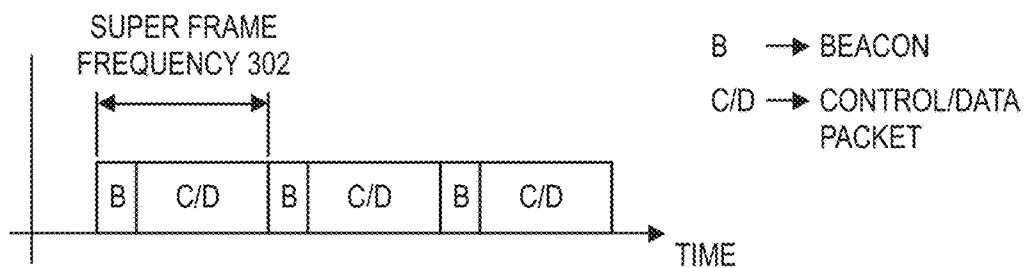
FIG. 3 illustrates a simplified superframe in accordance with one example.

FIG. 3 illustrates a simplified superframe in accordance with one example. A superframe 300 has a repeating superframe interval and associated frequency 302. Each superframe interval includes a beacon time slot (B), and control/data packet slots (C/D). In one example, a hub transmits a superframe at fixed time intervals. This allows the sensor nodes to be synchronized with its hub via beacon in the superframe 300.

Figure 4A:
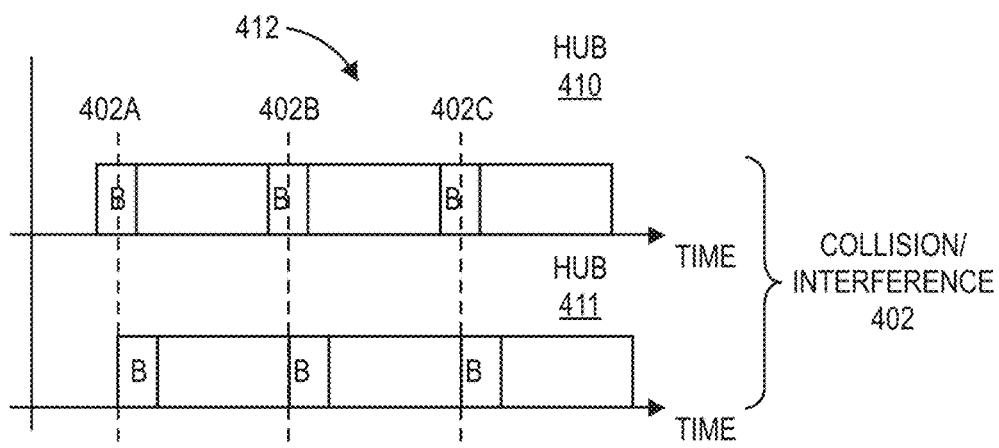
FIG. 4A illustrates adjacent channel interference 402 for hubs 410 and 411

In a large deployment, there are multiple hubs to cover a larger area (e.g., industrial application, warehouse, large residential area). This leads to adjacent channel interference 402 that is illustrated as 402a, 402b, and 402c for hubs 410 and 411 of FIG. 4A. Since availability of channels is limited, more than one hub could be on same channel. This leads to same channel interference as illustrated in FIG. 4A.

Superframe 422 of hub 420 could overlap with superframe 412 of hub 410 such that beacon B of hub 420 is aligned with beacon B of hub 410. In such a scenario, hub 420 beacon's will collide (or defer) and it's beacon won't be transmitted. This could continue for a long period of time and nodes connected to hub 420 will lose synchronization with hub 420. The control/data slots of these superframes can include control or data or alternatively can be empty time slots without any control/data information.

Figure 4B:
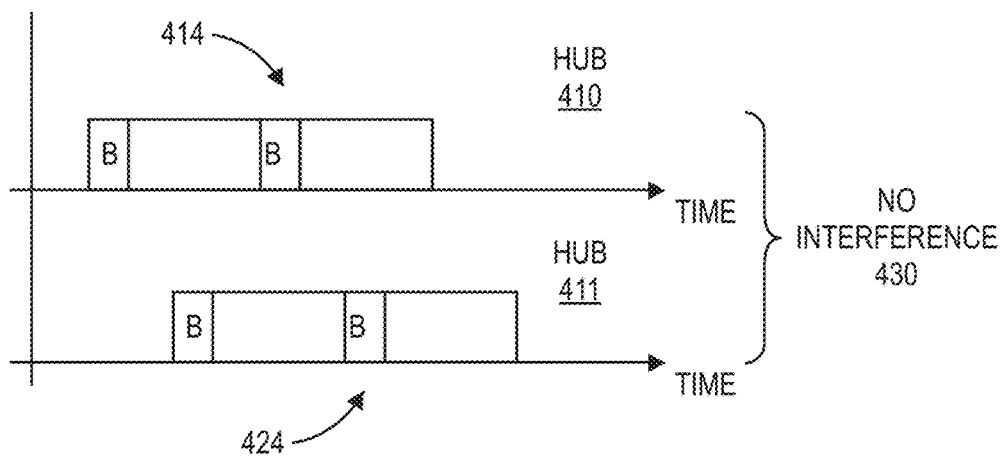
FIG. 4B illustrates an offset between superframe 414 of hub 410 and superframe 424 of hub 420 for no channel interference.

FIG. 4B illustrates superframe 414 of hub 410 and superframe 424 of hub 420. These superframes are offset in time such that no interference 430 occurs for the beacons even if the hubs use the same RF channel. The C/D can be empty slots in this example.

Typically, multiple nodes are connected to a single hub. Multiple nodes send data to a hub in a TDMA fashion. So, if data payload is large (e.g., image/video) then transfer of data packets from all nodes occupy a RF channel for a long time.

Figure 5:
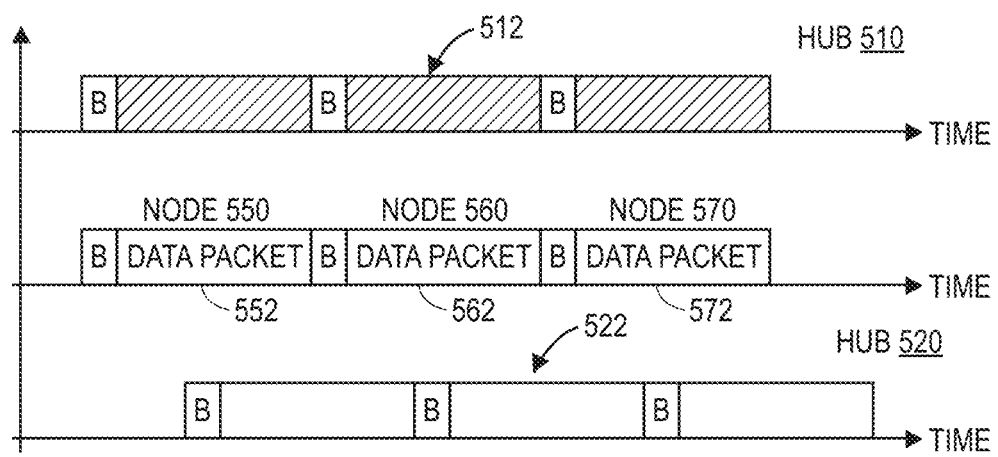
FIG. 5 illustrates timing diagrams for transmissions of hubs and sensor nodes in one example.

FIG. 5 illustrates timing diagrams for transmissions of hubs and sensor nodes in one example. Hub 510 transmits a superframe 512 with beacon B and empty slots. Sensors nodes 550, 560, and 570 are associated with hub 510 and transmit data packets 552, 562, and 572, respectively, between beacons. Hub 520 transmits a superframe 522 with beacon B and empty slots. If the sensor nodes are in close proximity with hub 520, then there will be adjacent channel interference due to data packets of the sensor nodes being transmitted during a same time period as beacons of the hub 520. Thus, hub 520 will not be able to send repeated beacons (e.g., beacon packets).

In the above examples, interference between hubs (FIGS. 4A and 4B) and interference between hub and nodes (FIG. 5), the superframe of a first hub overlaps with another hub's superframe or transmissions of sensor nodes. Thus transmissions of beacons and data may occur at a same time period causing collisions and thus only one of hub and sensor node can safely send a transmission. This could occur for a long time which affects the transmission of beacon and will lead to the loss of synchronization of the nodes to their respective hub. Such a loss of synchronization can happen due to same channel interference and adjacent channel interference.

Once a node loses the synchronization with its hub, the node starts scanning for a beacon again. This causes a node to scan the channel for a while to find the beacons of hubs. This increases downtime of node operations as well as increases the power consumption of the nodes. Node downtime causes reduced data throughput and missed events.

The present design includes three novel mechanisms to mitigate the interference issue of such a TDMA based wireless communication system. These mechanisms include Dynamic Beacon Frequency Control, Dynamic time slot within superframe, and Delay after long transmission.

Figure 6:
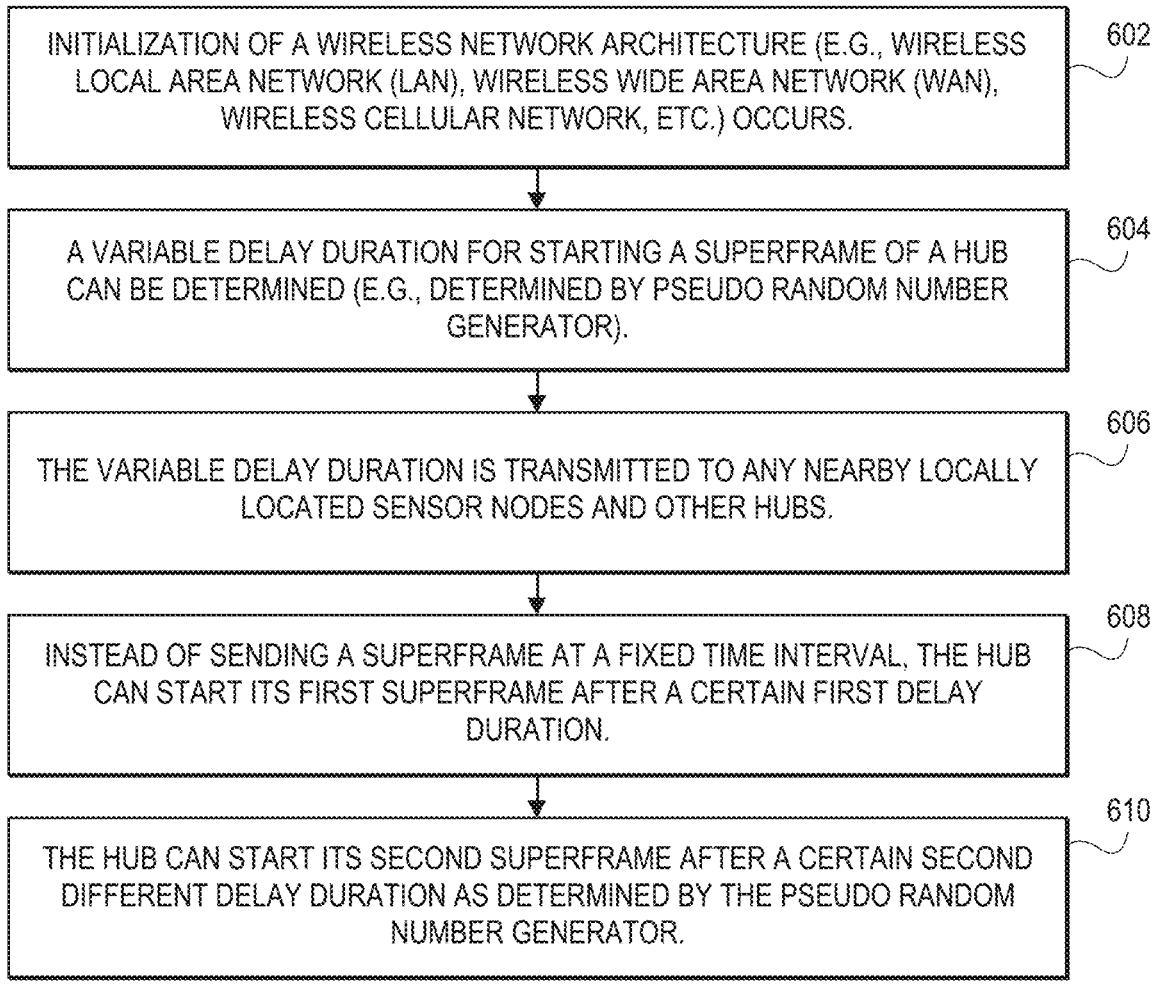
FIG. 6 illustrates operations of a Dynamic Beacon Frequency Control method 600 in accordance with one embodiment.

FIG. 6 illustrates operations of a Dynamic Beacon Frequency Control method 600 in accordance with one embodiment. The operations of method 600 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one of a wireless device within a localization space and a cloud network entity perform the operations of method 600.

At operation 602, initialization of a wireless network architecture (e.g., wireless local area network (LAN), wireless wide area network (WAN), wireless cellular network, etc.) occurs. At operation 604, a variable delay duration for starting a superframe of a hub can be determined (e.g., determined by pseudo random number generator). At operation 606, the variable delay duration is transmitted to any nearby locally located sensor nodes (e.g., wireless devices, wireless cameras, etc.) and other hubs. At operation 608, instead of sending a superframe at a fixed time interval, the hub can start its first superframe after a certain first delay duration. At operation 610, the hub can start its second superframe after a certain second different delay duration as determined by the pseudo random number.

Figure 7:
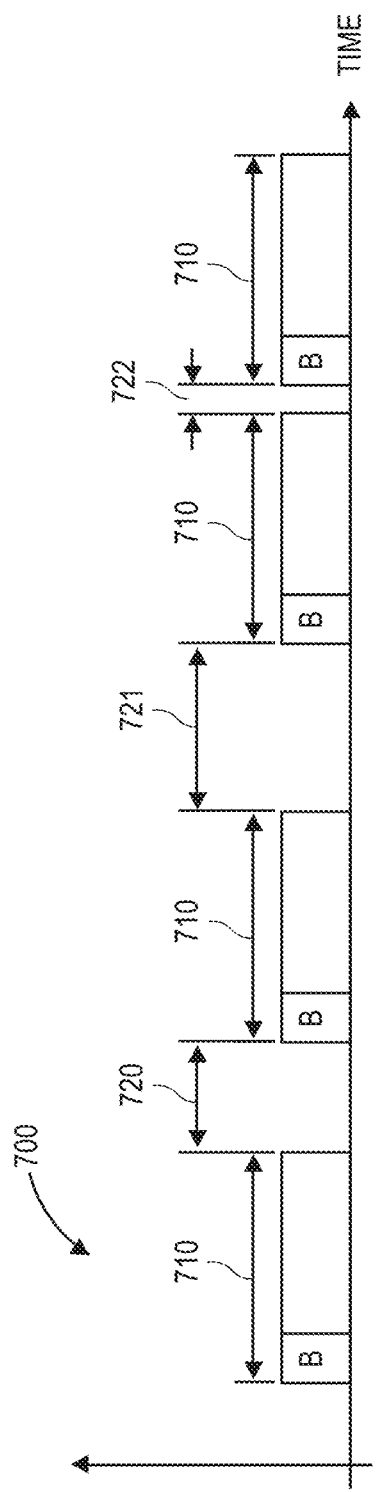
FIG. 7 illustrates a timing diagram of the delayed superframe for the hub in accordance with one embodiment.

FIG. 7 illustrates a timing diagram of the delayed superframe for the hub in accordance with one embodiment. A superframe 700 has a superframe interval that is a fixed superframe duration 710 plus the pseudo random delay (e.g., 720, 721, 722) having a variable duration. The pseudo random delay is decided by a pseudo random generator that is shared between hub and the nodes. The pseudo random number generation allow them to have the same delay without hand-shaking between hub and nodes.

For hub to hub channel interference, even if two hub's beacon timeslots are aligned, pseudo randomness of the delay between superframe can quickly break the overlapping superframe patterns. Thus, this method 600 reduces overall chances of two hubs repeatedly trying to send beacon at a same time frame.

For hub to node interference, one hub could use variable pseudo random delay duration to send its beacon. Also due to pseudo random time interval, another hub's beacon will not overlap with other node's data transmission for a longer time period. Using proposed mechanism of method 600 and superframe illustrated in FIG. 7, chances of hub's beacon transmitting at same time with other nodes or hubs reduces significantly.

For a system in which a superframe has fixed timeslots for beacon, control packets (for uplink and downlink) and data packets (for uplink and downlink), once interference between hubs and sensor nodes (e.g., wireless devices, wireless cameras, etc.) happens, such interference can last long time.

Continuous interference that lasts for long time period is undesirable compared with multiple short interferences. While long interference can completely stop the operation of system, some short interference can be addressed by retransmissions of packets or re-synchronization before sensor nodes completely lose synchronization with the hub.

When these time slots are placed dynamically for a Dynamic time slot within superframe method, for example placing each type of timeslots differently every time a new superframe starts, the chances of overlapping of beacon, control and data time slots can be varying for each superframe. Thus increasing the chances of transmission from both hubs without long interference and hence, improving the transmission rate and reducing the loss of network synchronization.

Figure 8:
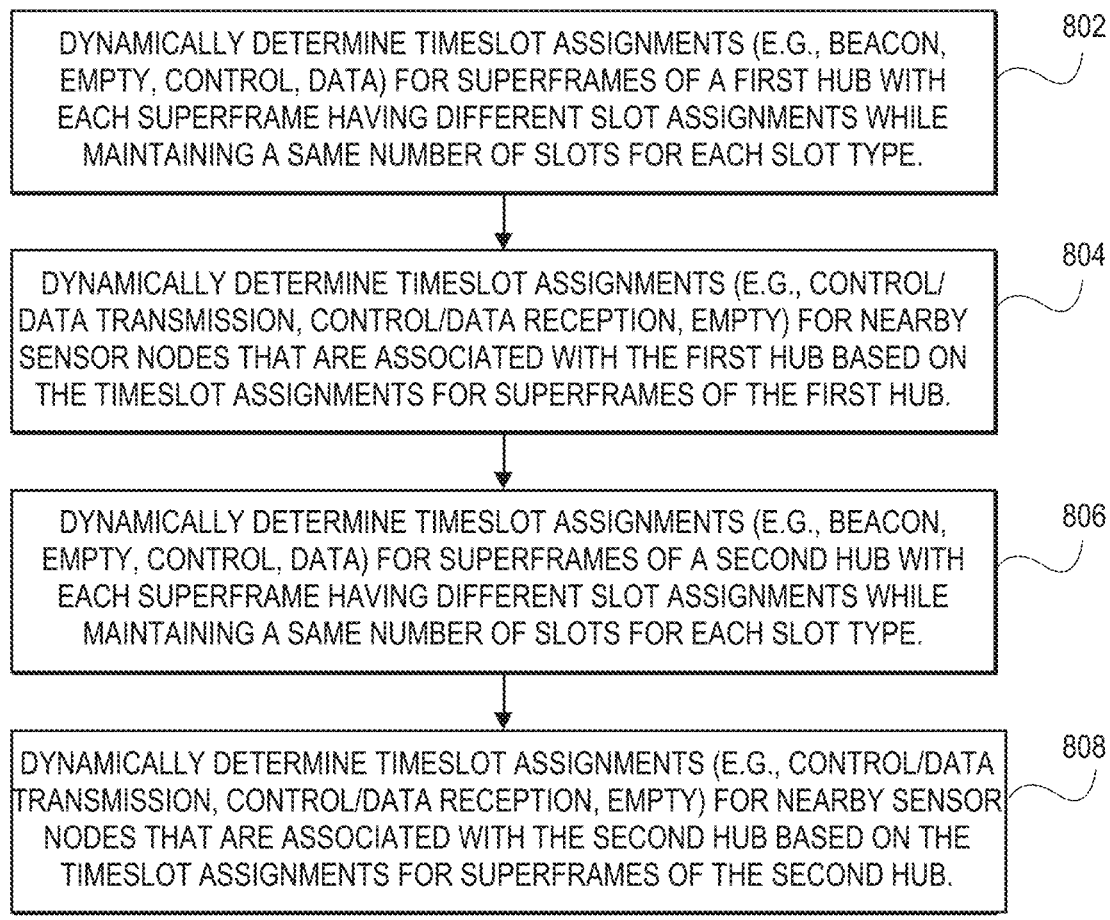
FIG. 8 illustrates operations of a Dynamic time slot within superframe method 800 in accordance with one embodiment.

FIG. 8 illustrates operations of a Dynamic time slot within superframe method 800 in accordance with one embodiment. The operations of method 800 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one wireless device within a localization space and a cloud network entity perform the operations of method 800.

At operation 802, processing logic dynamically determines timeslot assignments (e.g., beacon packet timeslot, control packet timeslot, data packet reception, empty, etc.) for superframes of a first hub with each superframe having different slot assignments while maintaining a same number of slots for each slot type.

At operation 804, processing logic dynamically determines timeslot assignments (e.g., control transmission, data transmission, control reception, data reception, empty) for nearby sensor nodes that are associated with the first hub based on the timeslot assignments for superframes of the first hub. A first slot assignment for a first superframe is different than a second superframe while maintaining a same number of slots for each slot type of the sensor nodes.

At operation 806, processing logic dynamically determines timeslot assignments (e.g., beacon packet timeslot, control packet timeslot, data packet reception, empty, etc.) for superframes of a second hub with each superframe having different slot assignments while maintaining a same number of slots for each slot type.

At operation 808, processing logic dynamically determines timeslot assignments (e.g., control transmission, data transmission, control reception, data reception, empty) for nearby sensor nodes that are associated with the second hub based on the timeslot assignments for superframes of the second hub. A first slot assignment for a first superframe is different than a second superframe while maintaining a same number of slots for each slot type of the sensor nodes. Timeslot assignments for the second hub and associated sensor nodes can be based on timeslot assignments for the first hub and associated sensor nodes in order to avoid interference.

FIGS. 9A and 9B illustrate timing diagrams of a Dynamic time slot within a superframe for multiple hubs and sensor nodes (e.g., wireless devices, wireless cameras, etc.) in accordance with one embodiment. A superframe 902 of hub 910 has a superframe interval with timeslots 0-12 that is a fixed superframe duration having beacon packet timeslot 913, control packet timeslot 923, and data packet reception timeslots (e.g., positions 1-6, 8-12). Sensors nodes 911 and 912 that are associated with the hub 910 have reception slots during beacon and control time slots of the hub 910. The sensor nodes 911 and 912 can have data and control packet timeslots during reception timeslots of the hub 910. Pseudo random number generation is used for deciding the type of timeslots for different superframes. The superframe 904 of hub 910 has a beacon packet timeslot 914 in a different position than the beacon packet timeslot 913. In a similar manner, the superframe 904 has a control packet timeslot 915 in a different position than the control packet timeslot 923 of an earlier superframe. Thus hub and nodes can agree on the superframe configuration without complex handshaking.

A superframe 952 of hub 950 has a superframe interval with timeslots 0-12 that is a fixed superframe duration having beacon packet timeslot 962, control packet timeslot 966, and data packet reception timeslots (e.g., positions 0-5, 7-11). Sensors nodes 951 and 952 that are associated with the hub 950 have reception slots in positions 6 and 12 during beacon and control time slots of the hub 950. The sensor nodes 951 and 952 can have data and control packet timeslots during data and control packet reception timeslots of the hub 950. Pseudo random number generation is used for deciding the type of timeslots for different superframes. The superframe 954 of hub 950 has a beacon packet timeslot 964 in a different position than the beacon packet timeslot 962. In a similar manner, the superframe 954 has a control packet timeslot 968 in a different position than the control packet timeslot 966 of an earlier superframe. Arrows labeled on the timeslots indicate a direction of transmission from a hub to a node (e.g., beacon, control) and also from a node to a hub (e.g., data, control). Empty slots can exist in which both hub and device do not send or receive any packets.

Figure 10:
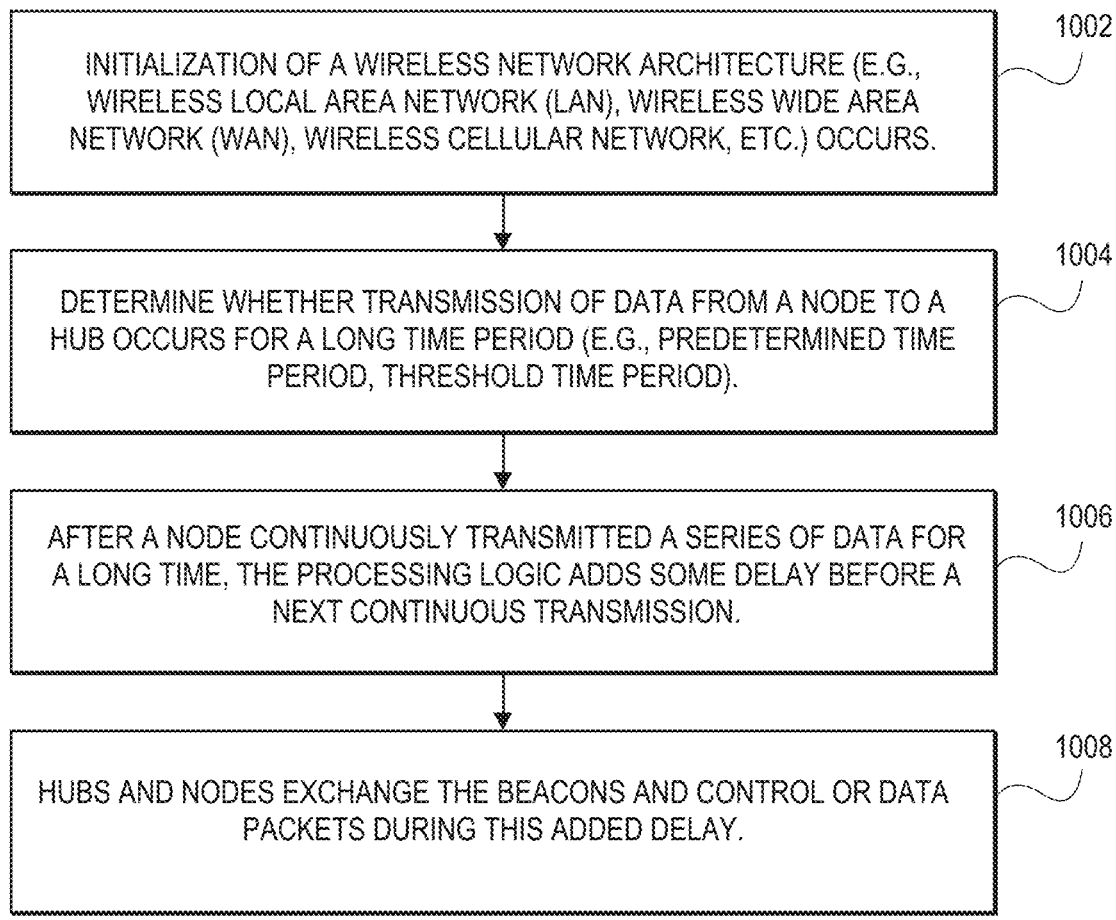
FIG. 10 illustrates operations of a delay after long transmission method 1000 in accordance with one embodiment.

FIG. 10 illustrates operations of a delay after long transmission method 1000 in accordance with one embodiment. The operations of method 1000 may be executed by a wireless device, a wireless control device of a hub (e.g., an apparatus), cloud network entity, or system, which includes processing circuitry or processing logic. The processing logic may include hardware (circuitry, dedicated logic, etc.), software (such as is run on a general purpose computer system or a dedicated machine or a device), or a combination of both. In one embodiment, at least one of a wireless device within a localization space and a cloud network entity perform the operations of method 1000.

At operation 1002, initialization of a wireless network architecture (e.g., wireless local area network (LAN), wireless wide area network (WAN), wireless cellular network, etc.) occurs. At operation 1004, processing logic determines whether transmission of data from a node to a hub occurs for a long time period (e.g., predetermined time period). This may occur when the data being transmitted is large and one particular node can occupy the channel for an excessively long time. Such a long transmission prevents other hubs and nodes from sending their beacon and data, which causes the stop of system operation due to lost network synchronization.

Thus, after a node continuously transmitted a series of data for a long time, at operation 1006, the processing logic adds some delay before a next continuous transmission. At operation 1008, hubs and nodes exchange the beacons and control or data packets during this added delay. Such delay between long transmissions helps in keeping hub and node synchronized and connected.

The communication between hubs, nodes, and wireless arbitrary devices as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, 5G, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs (e.g., a master node, an anchor node) may be implemented in a variety of ways including narrow-band, channel overlapping, channel stepping, multi-channel wide band, and ultra-wide band communications.

The hubs may be physically implemented in numerous ways in accordance with embodiments of the invention. FIG. 11A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 11B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 (e.g., LAN RF circuitry, WAN RF circuitry, cellular RF circuitry) communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 12B:
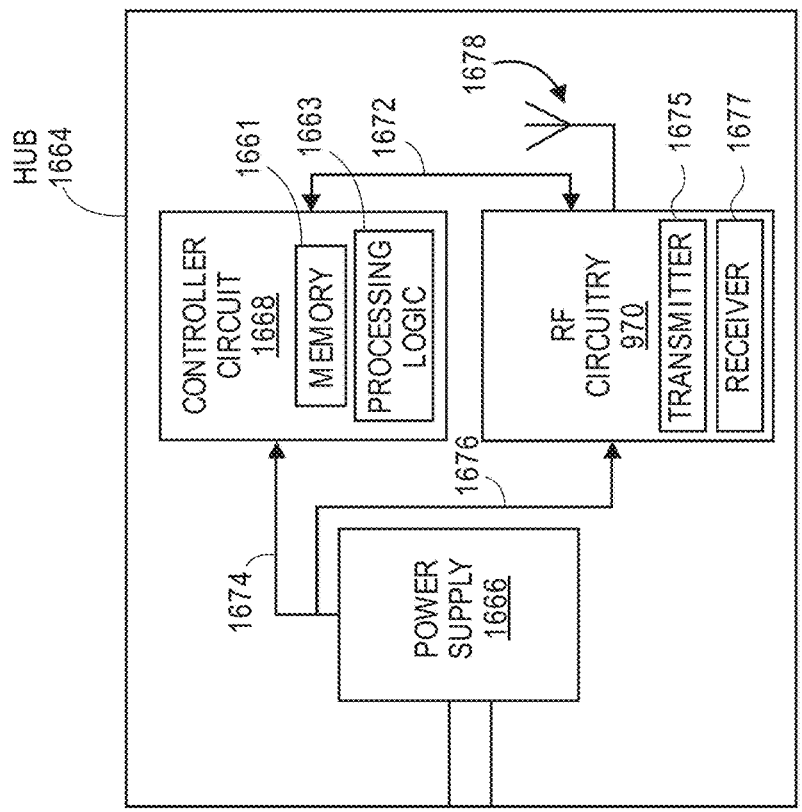
FIG. 12B shows an exemplary embodiment of a block diagram of a hub 1664 implemented as a card for deployment in a computer system, appliance, or communication hub in accordance with one embodiment.
Figure 12A:
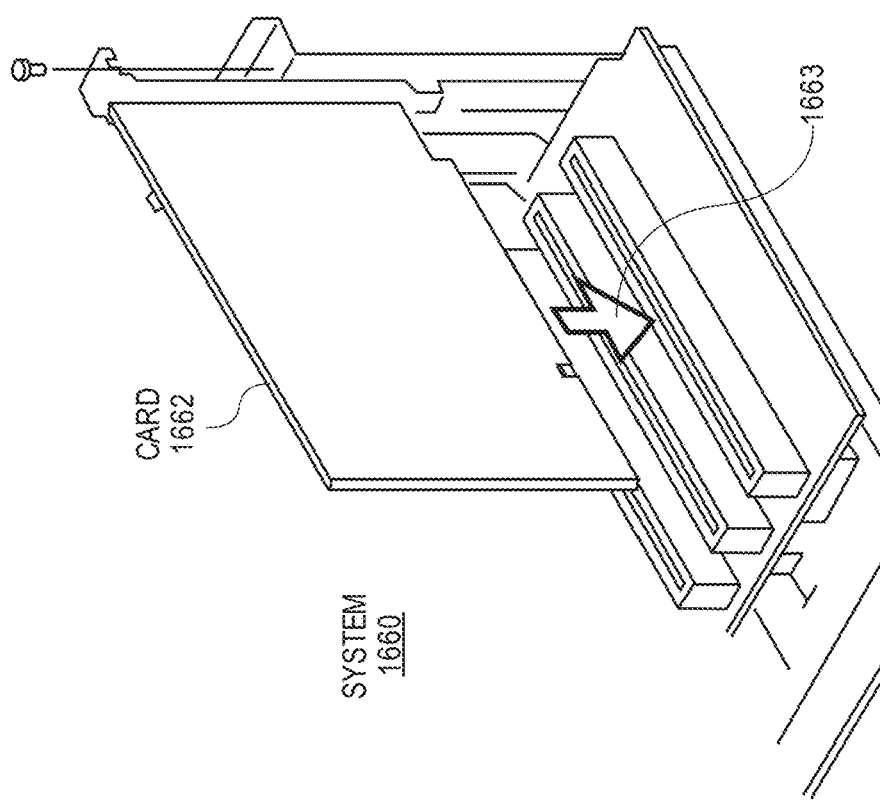
FIG. 12A shows an exemplary embodiment of a hub implemented as a card for deployment in a computer system, appliance, or communication hub in accordance with one embodiment.

FIG. 12A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 12B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network including a wireless arbitrary device as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 (e.g., LAN RF circuitry, WAN RF circuitry, cellular RF circuitry) communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 12C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 12D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network including a wireless arbitrary device as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The RF circuitry 1692 includes at least one of LAN RF circuitry, WAN RF circuitry, and cellular RF circuitry. The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuity 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, a memory for storing instructions includes one or more processing units to execute instructions for controlling a plurality of sensor nodes in a wireless network architecture (e.g., wireless local area network (LAN), wireless wide area network (WAN), wireless cellular network) and determining locations of the plurality of sensor nodes and a wireless arbitrary device and radio frequency (RF) circuitry to transmit communications to and receive communications from the plurality of sensor nodes each having a wireless device with a transmitter and a receiver to enable bi-directional communications with the RF circuitry of the apparatus in the wireless network architecture.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 13:
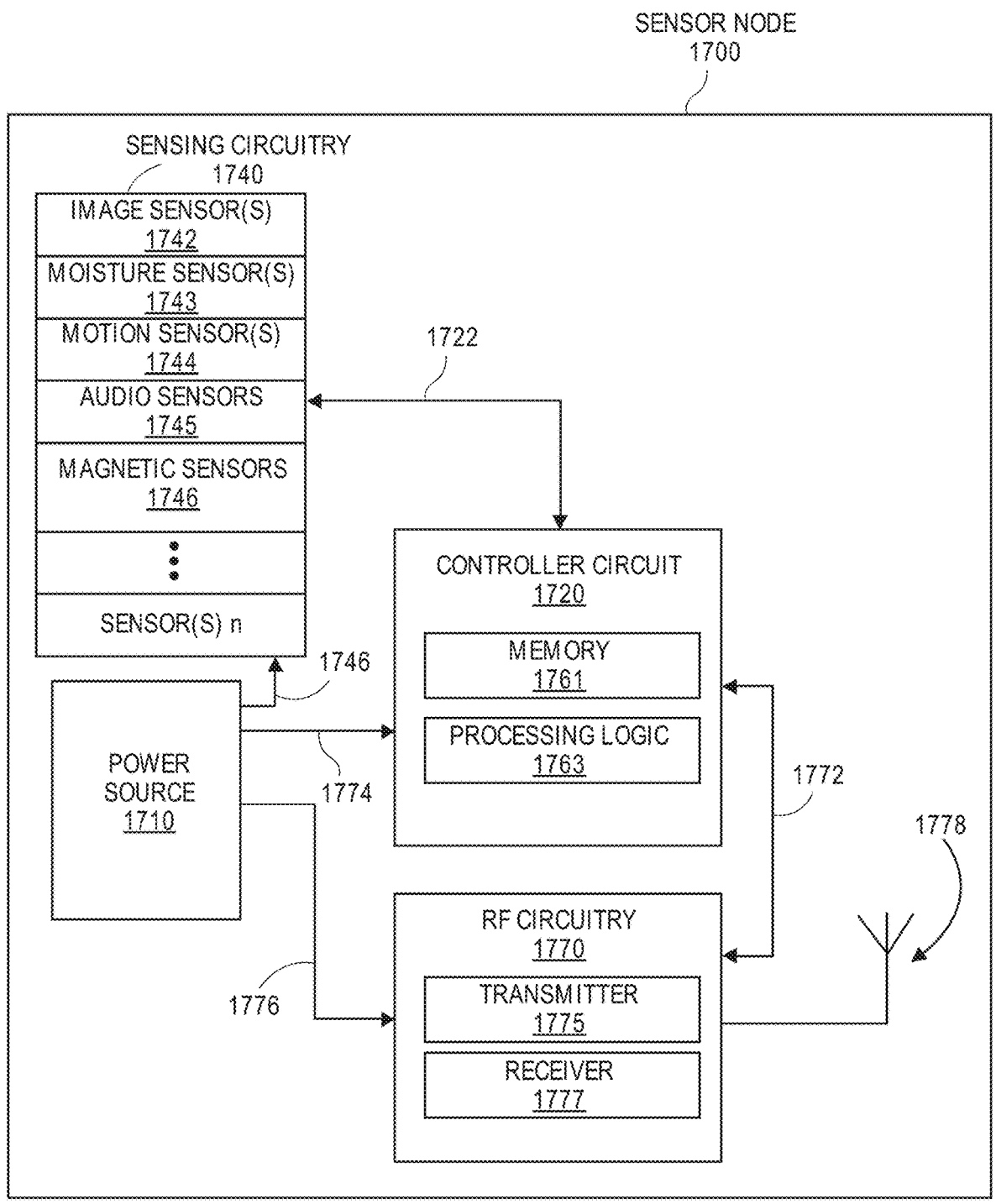
FIG. 13 illustrates a block diagram of a sensor node in accordance with one embodiment.

FIG. 13 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The RF circuitry 1770 includes at least one of LAN RF circuitry, WAN RF circuitry, and cellular RF circuitry. The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 14:
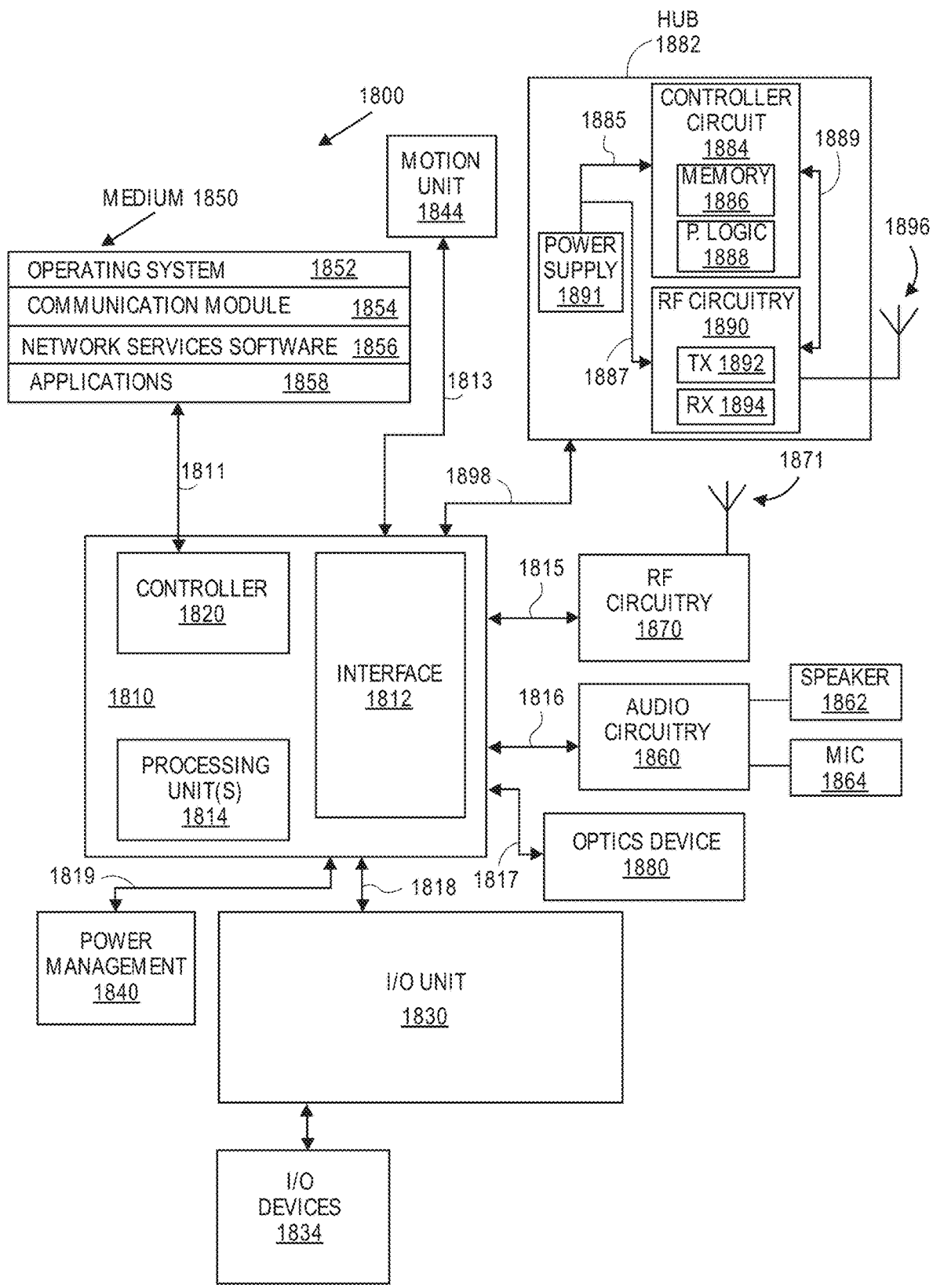
FIG. 14 illustrates a block diagram of a system or appliance 1800 having a hub in accordance with one embodiment.

FIG. 14 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The RF circuitry 1890 includes at least one of LAN RF circuitry, WAN RF circuitry, and cellular RF circuitry. The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, industrial applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

Any of the following examples can be combined into a single embodiment or these examples can be separate embodiments. In one example, an asynchronous system for localization of nodes in a wireless network architecture (e.g., wireless local area network (LAN), wireless wide area network (WAN), wireless cellular network) comprises Various batteries could be used in the wireless sensor nodes, including lithium-based chemistries such as Lithium Ion, Lithium Thionyl Chloride, Lithium Manganese Oxide, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 15A:
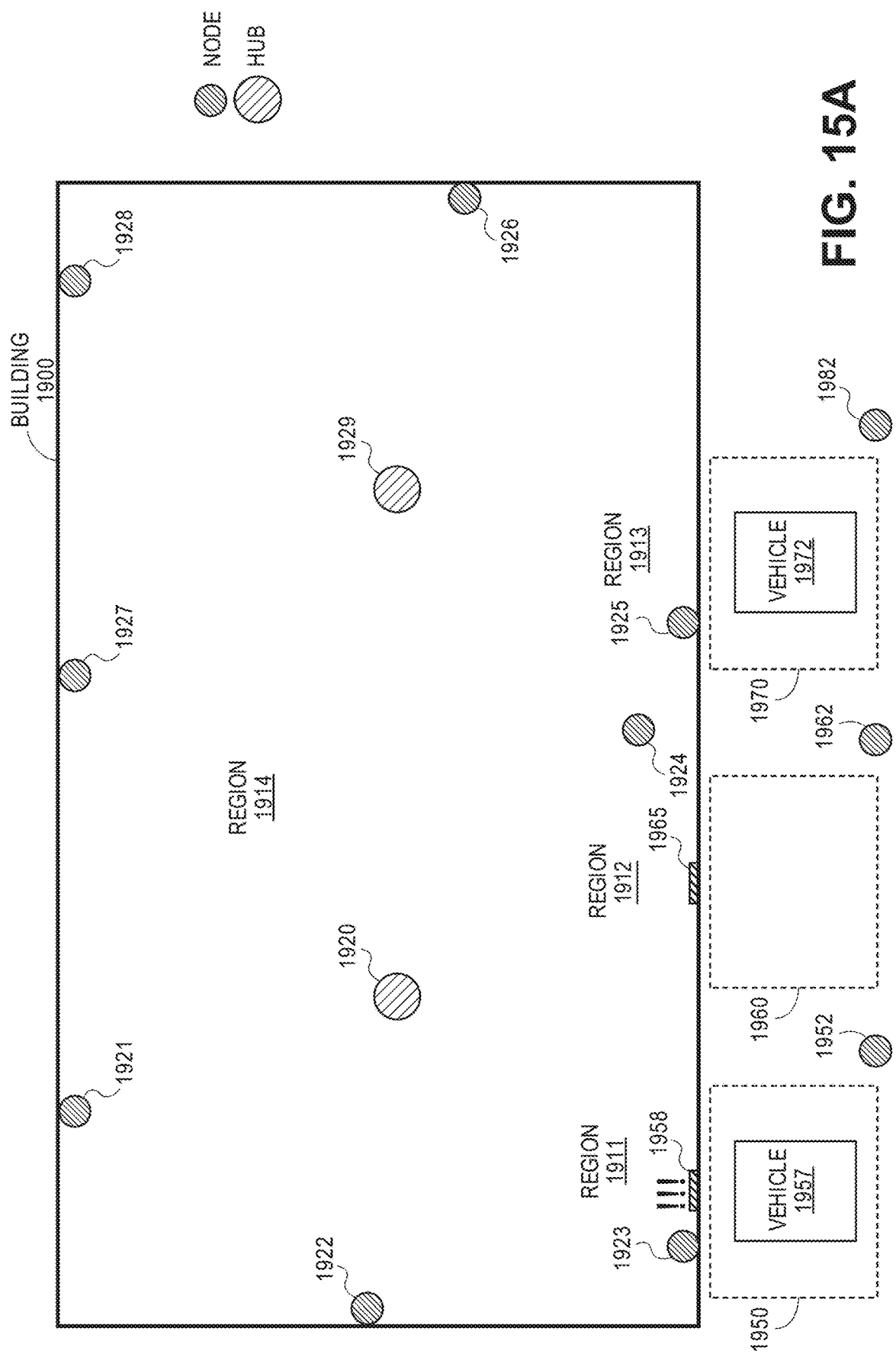
FIGS. 15A and 15B show how a wireless network monitors conditions within and outside of an industrial building.
Figure 15B:
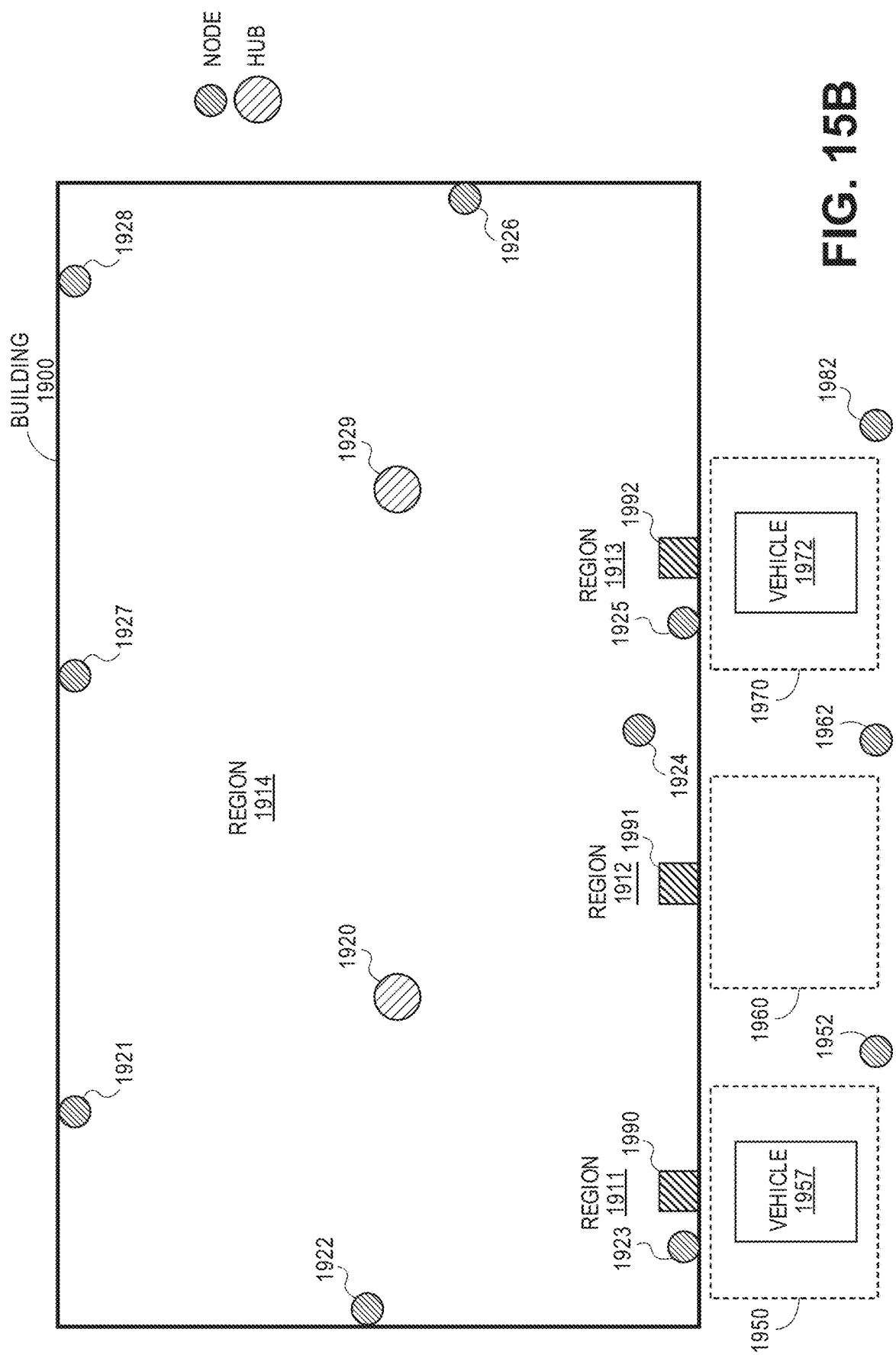

FIGS. 15A and 15B show how a wireless network monitors conditions within and outside of an environment (e.g., building, industrial building). In this example, the nodes 1921-1928, 1952, 1962, and 1982 can be communicating with the hub 1920 or 1929, with a remote device of a cloud service, and amongst each other in the different regions of an industrial building and also outside of the industrial building near loading zones. The hubs and nodes implement at least one of the three novel mechanisms described herein to mitigate the interference issue of such a TDMA based wireless communication system. These mechanisms include Dynamic Beacon Frequency Control, Dynamic time slot within superframe, and Delay after long transmission.

The wireless network monitors assets (e.g., equipment, materials, products, robots, machines, vehicles, users) and conditions within the industrial building and outside the building near loading zones (or unloading zones) for vehicles and machinery. The vehicles may transport cargo or product between locations (e.g., warehouses, distribution centers, retail stores, etc.).

In one example, at least two nodes among nodes 1923-1926, 1952, 1962, 1982 monitor each of zones 1950, 1960, and 1970. Each node includes various types of sensing circuitry and sensor(s) (e.g., image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.) as discussed herein. In another example, at least three nodes among nodes 1923-1926, 1952, 1962, 1982 monitor each of zones 1950, 1960, and 1970. At least one of the nodes may be a wireless camera with wireless protocols for communicating with the wireless network.

The nodes can sense objects (e.g., objects 1958, 1965, 1990, 1991, 1992, etc.) within the building 1900 or outside the building near the zones 1950, 1960, and 1970. The nodes can sense vehicles, objects, or machinery outside the building within the zones 1950, 1960, and 1970 or in close proximity to the zones.

FIG. 15A illustrates a vehicle 1957 that is sensed within zone 1950, no vehicle within zone 1960, a sensed vehicle 1972 within zone 1970, an undesired object 1958, and an undesired object 1965. Machine learning models may be utilized in order to determine whether a vehicle is located within a zone and also determine whether an object is desired or undesired at its current location. Nodes obtain data (e.g., images, video, or other data), optionally process this data, and transmit this data to a remote device of a cloud service or to a hub, and then machine learning models are utilized by processing the data to determine whether a vehicle is located within the zone and also classify a type of object that may interfere with unloading or loading of a vehicle. The object may also assist with loading or unloading of a vehicle (e.g., truck, semi truck, etc.) or powered device. The loading/unloading zones may be vehicle berths that are located adjacent to docks, bays, or openings of the building to facilitate loading and unloading. The openings of the building may include doors to allow access to the building.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for providing a wireless asymmetric network, comprising:
   a hub having one or more processing units and at least one antenna for transmitting and receiving radio frequency (RF) communications in the wireless asymmetric network; and
   a plurality of sensor nodes each having a wireless device with a transmitter and a receiver to enable bi-directional RF communications with the hub in the wireless asymmetric network, the one or more processing units are configured to determine dynamic beacon frequency control with a first variable delay duration for starting a first superframe of the hub and a second different variable delay duration between the first superframe and a start of a second superframe.

2. The system of claim 1, further comprising:
   a remote device to communicate with at least one of the hub and the plurality of sensor nodes, wherein the remote device or hub is configured to determine the first and second variable delay durations of the respective first and second superframes and thus dynamic beacon frequency control based on a pseudo random number generator.

3. The system of claim 2, wherein the hub is further configured to transmit the first and second variable delay durations of the respective first and second superframes for the hub to any nearby locally located sensor nodes and other hubs.

4. The system of claim 3, wherein the hub is further configured to start the first superframe after the first variable delay duration and then start the second superframe after the second different variable delay duration as determined by the pseudo random number generator instead of sending the first and second superframes at a fixed time interval.

5. The system of claim 4, further comprising:
   an additional hub that is configured to start a first superframe after a certain third delay duration and then start a second superframe after a certain fourth different delay duration.

6. An apparatus, comprising:
   a memory for storing instructions;
   one or more processing units to execute instructions for controlling a plurality of wireless sensor nodes; and
   radio frequency (RF) circuitry to transmit communications to and receive communications from the plurality of wireless sensor nodes in a wireless asymmetric network each having a wireless device with a transmitter and a receiver to enable bi-directional communications with the RF circuitry of the apparatus in the wireless network architecture, wherein the one or more processing units of the apparatus are configured to execute instructions for dynamic beacon frequency control with a first variable delay duration for starting a first superframe of the apparatus and a second different variable delay duration between the first superframe and a start of a second superframe.

7. The apparatus of claim 6, further comprising:
   a remote device to communicate with at least one of the apparatus and the plurality of sensor nodes, wherein the remote device or apparatus is configured to determine the first and second variable delay durations of the respective first and second superframes and thus dynamic beacon frequency control based on a pseudo random number generator.

8. The apparatus of claim 7, wherein the one or more processing units are further configured to transmit the first and second variable delay durations of the respective first and second superframes for the apparatus to any nearby locally located sensor nodes and other hubs.

9. The apparatus of claim 8, wherein the one or more processing units are further configured to start the first superframe after the first variable delay duration and then start the second superframe after the second different variable delay duration.

10. The apparatus of claim 9, wherein a beacon is positioned in a first time slot of the first and second superframes.

11. A sensor node, comprising:
    a memory to store data including image data;
    an image capturing device to capture image data of regions of an environment;
    one or more processing units coupled to the image capturing device; and
    radio frequency (RF) circuitry to transmit RF communications to and receive RF communications from other wireless nodes within a wireless network architecture, wherein the one or more processing units of the sensor node are configured to receive instructions for scheduling timeslots of the sensor node to avoid interference with a hub based upon dynamic beacon frequency control with a first variable delay duration for starting a first superframe of the hub and a second different variable delay duration between the first superframe and a start of a second superframe.

12. The sensor node of claim 11, wherein the dynamic beacon frequency control is based on a pseudo random number generator.

13. The sensor node of claim 11, wherein the one or more processing units of the sensor node are configured to receive the first variable delay duration of the first superframe for the hub.

14. The sensor node of claim 11, wherein the sensor node comprises a wireless HD camera.

* * * * *